United States Patent Office 3,614,874
Patented Oct. 26, 1971

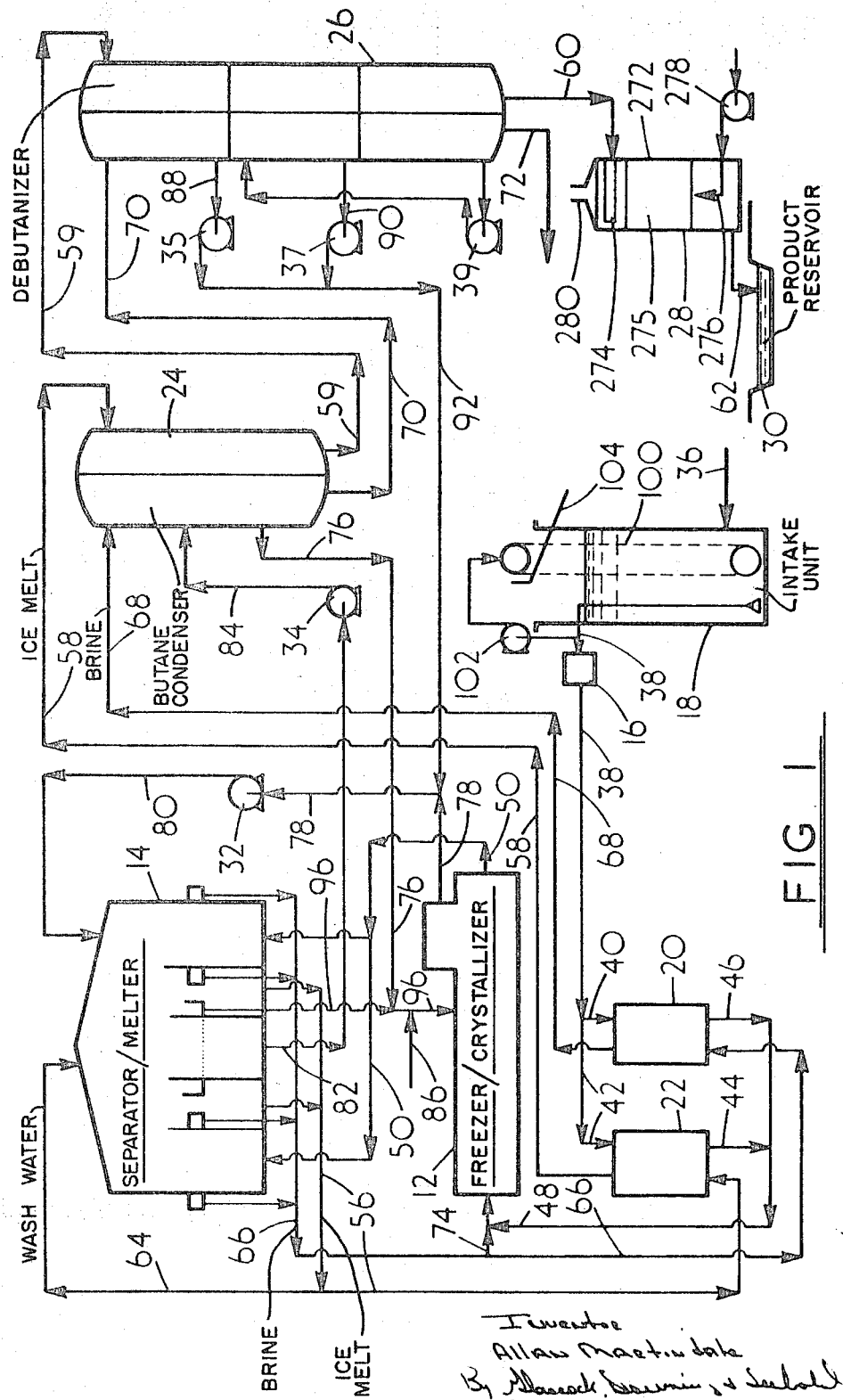

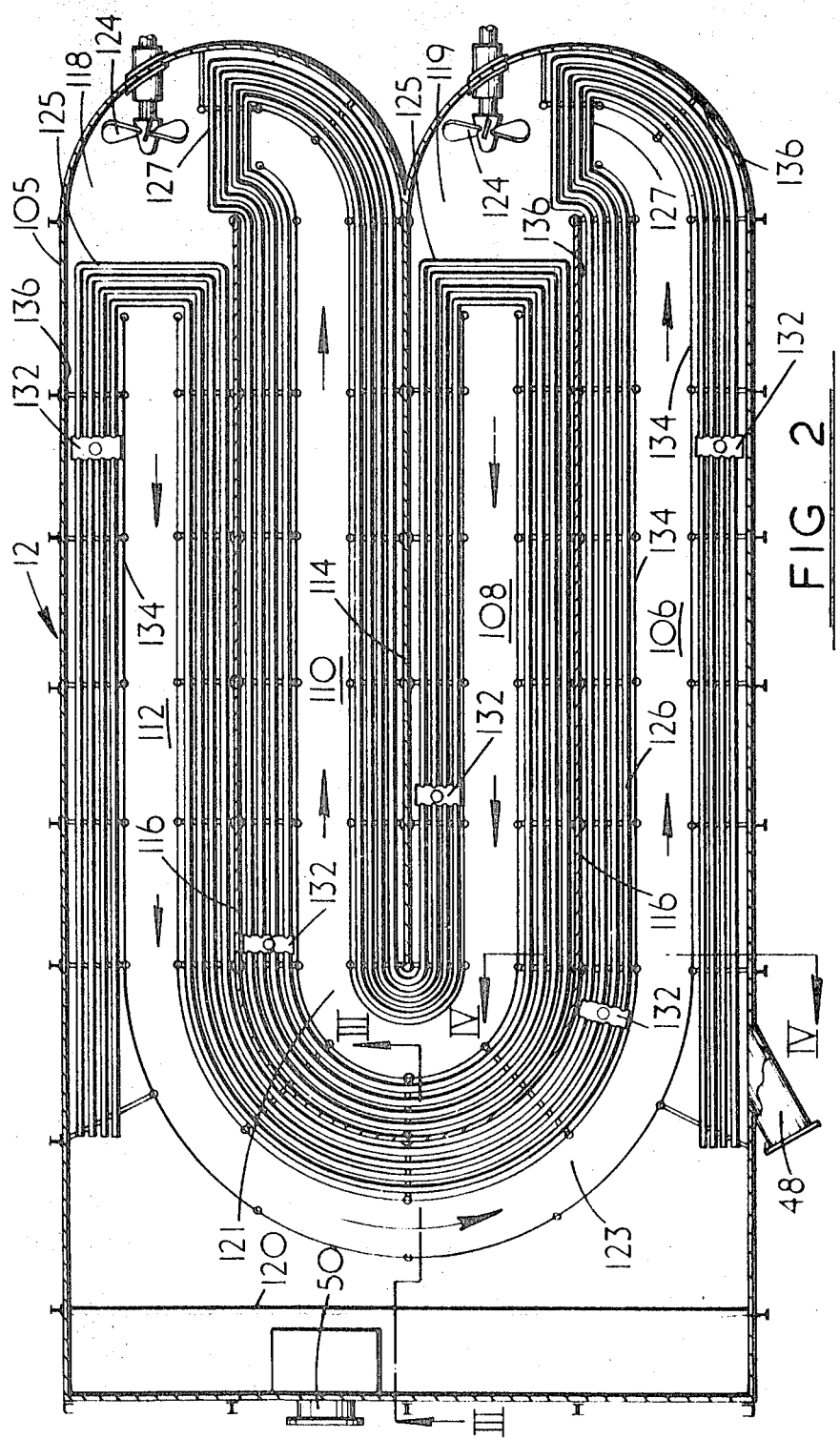

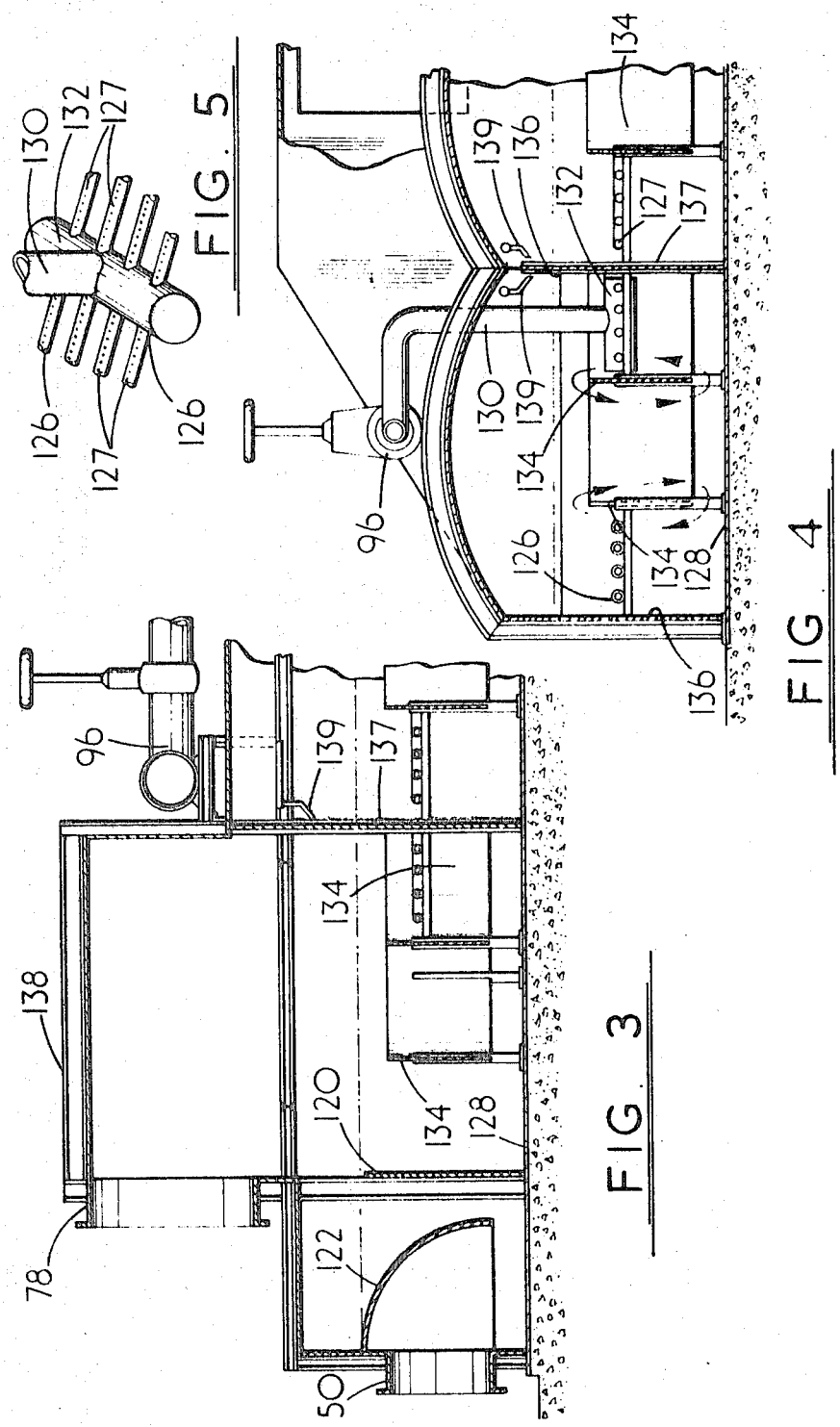

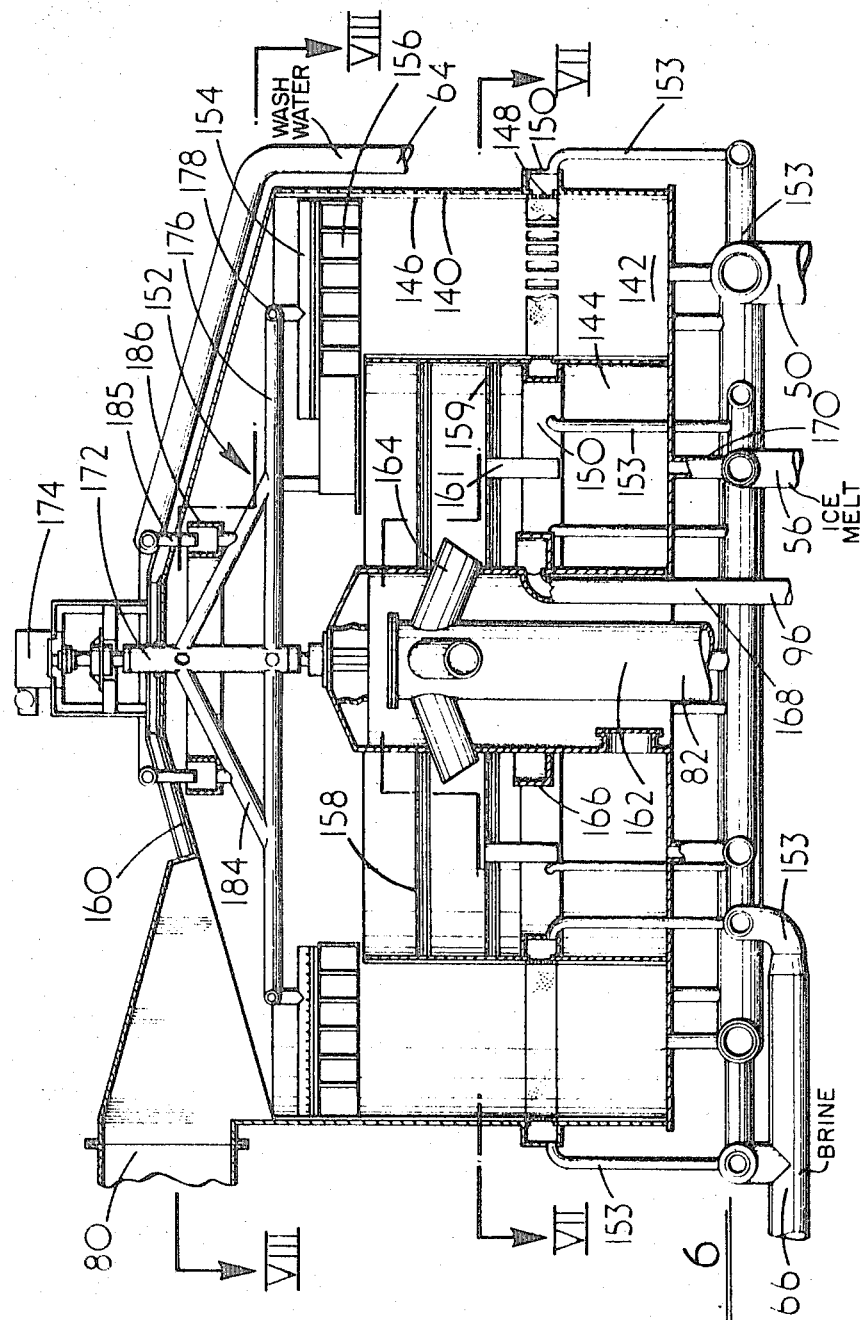

3,614,874
SEPARATOR-MELTER UNIT FOR DESALINATION
Allan Martindale, Bramhall, Bryan R. Parr, Sale, and Michael J. S. Smith, Abingdon, England, assignors to Simon-Carves Limited, Stockport, Cheshire, England
Filed Jan. 15, 1968, Ser. No. 697,804
Claims priority, application Great Britain, Jan. 17, 1967, 2,349/67
Int. Cl. B01d 9/04
U.S. Cl. 62—123                                    9 Claims

ABSTRACT OF THE DISCLOSURE

In the production of fresh water from saline water, ice crystals formed by boiling a volatile refrigerant in the saline water, are separated from saline water in one chamber and passed over to another for melting to provide the fresh water.

---

This invention is concerned with improvements in or relating to desalination.

Shortage of fresh water is an increasing world problem and it has been previously proposed to produce fresh water from, for example, sea water, by various methods of desalination. One previously proposed process of desalinating saline water to produce fresh water comprises the steps of freezing ice crystals out of the saline water, by boiling in the water a volatile liquid refrigerant immiscible with water, separating the ice crystals from their mother liquor, and melting the separated ice crystals; we mean this process when hereinafter we refer to a process of the kind referred to.

It is an object of the invention to provide an improved method of desalinating saline water.

It is another object of the invention to provide improved apparatus adapted for use in such a method.

Sea water usually contains between 32,000 and 38,000 parts per million of dissolved salts and to render it fit for drinking purposes it is, for example, desalinated to a salt concentration of less than 500 p.p.m., preferably less than 200 p.p.m., for other purposes however a higher salt concentration may be acceptable.

According to the present invention, there is provided apparatus for use in producing fresh water from a slurry of ice crystals in saline water, comprising an internal melting chamber, an annular separating chamber disposed around the melting chamber, a common wall between the two chambers, means for passing the slurry upwardly through the separating chamber, water spray means for spraying the upper surface of the slurry so as to wash the ice crystals, water drain means around the separating chamber for draining saline and spent wash waters from the separating chamber, rotatable plough means for transferring the separated and washed ice crystals over the common wall and into the melting chamber to be melted.

Such apparatus conveniently forms part of a desalination plant for the production of fresh water from saline water on a commercial scale.

An embodiment of the invention in a desalination plant will now be described, by way of example, with reference to the accompanying drawings, in which:

FIG. 1 shows a flow diagram of the desalination plant, in accordance with the invention, FIG. 2 shows a sectional plan view of a freezer/crystalliser of the plant;

FIG. 3 shows a section on the line III—III of FIG. 2;

FIG. 4 shows a section on the line IV—IV of FIG. 2;

FIG 5 shows a perspective view of parts of the freezer/crystalliser;

FIG. 6 shows a sectional side view of a separator/melter of the plant;

FIG. 14 shows a section on the line XIV—XIV of FIG. 13;

FIG. 15 shows a section on the line XV—XV of FIG. 13; and

FIG. 16 shows a section on the line XVI—XVI of FIG. 13.

Figure 7:
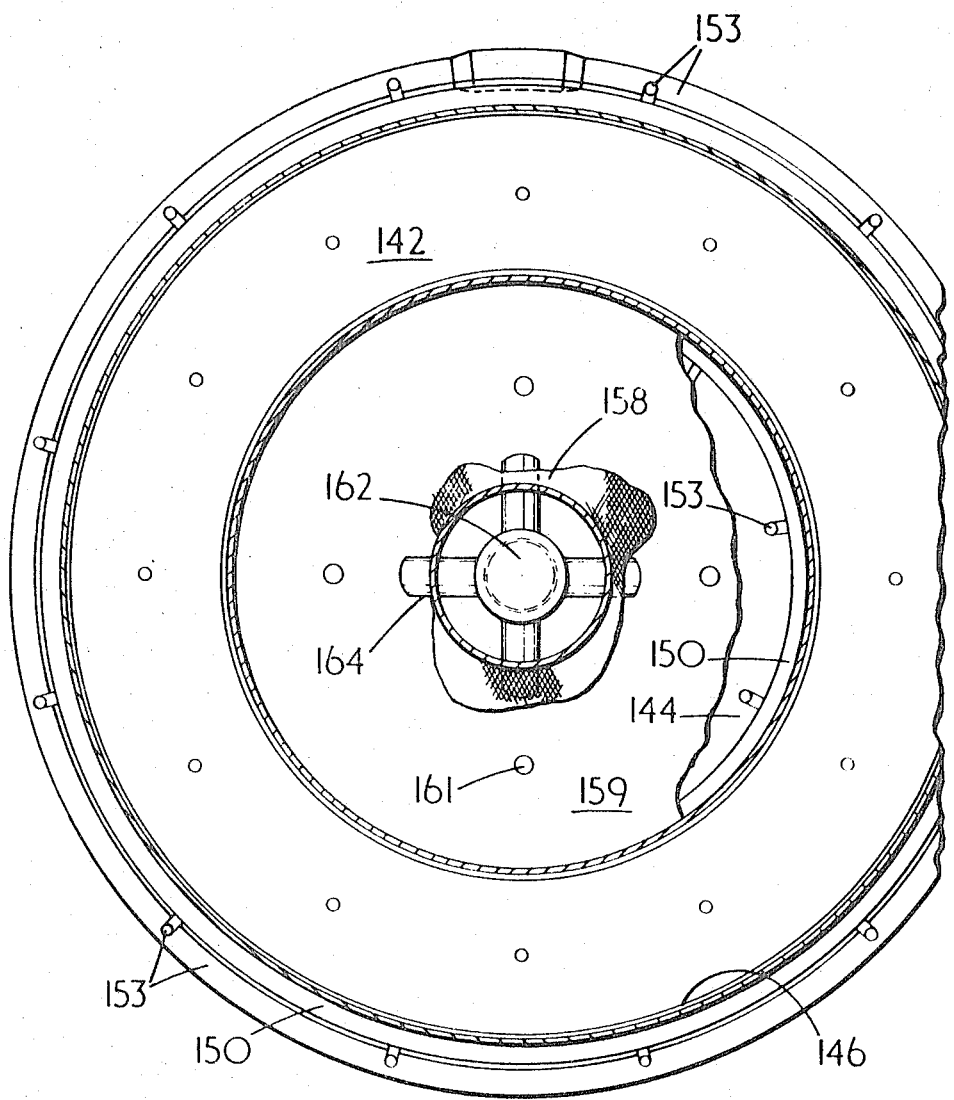
FIG. 7 shows a section on the line VII—VII of FIG. 6.

The desalination plant is adapted for use in desalinating sea water to produce fresh water by the steps of freezing ice crystals out of the sea water by boiling liquid butane in the water, separating the ice crystals from their mother liquor, and melting the separated ice crystals to provide the fresh water.

The plant (FIG. 1) comprises a freezer/crystalliser 12 adapted for use in producing ice crystals from sea water by direct contact refrigeration with boiling butane, a separator/melter 14 arranged to separate the ice crystals from their mother liquor, to wash adhering saline water from the ice crystals, and to melt the separated ice crystals.

The plant also comprises a sea water intake unit 18, a strainer 16, indirect contact heat exchangers 20, 22, a butane condenser 24, debutanisers 26, 28, a reservoir 30, compressors 32, 34, and vacuum pumps 35, 37, 39; the strainer 16, the heat exchangers 20, 22, the compressors 32, 34, and the pumps 35, 37, 39 are all of known type per se.

In the operation of the plant raw sea water is pumped continuously along a line 36 to the intake unit 18 where it is coarsely screened to remove large solid objects e.g. sea weed and fish. The sea water is pumped from the unit 18, along a line 38 which leads, via the strainer 16, to lines 40, 42 leading to the heat exchangers 20, 22 respectively; in the heat exchanger 20 the sea water is cooled by indirect heat exchange with reject saline water from the separator/melter 14; in the heat exchanger 22 the sea water is cooled by heat exchange with product water from the separator/melter 14. The cooled sea water leaves the heat exchangers 20, 22 by lines 44, 46, respectively which both lead into a line 48 leading into the freezer/crystalliser 12. In the freezer/crystalliser 12 ice crystals are formed and a slurry of ice crystals in saline water leaves the freezer/crystalliser 12 along a line 50 which leads to the separator/melter 14; in the freezer/crystalliser 12 the saline water is super-cooled by up to 0.3° F. Ice crystals separated in the separator/melter 14 are melted therein by direct contact with butane vapour. The water melted from the ice crystals passes from the separator/melter 14 along a line 56 which leads to the heat exchanger 22. From the heat exchanger 22 the water passes along a line 58 to the butane condenser 24.

The water then passes along a line 59 to the debutaniser 26 where small quantities of suspended and dissolved butane are removed from the water. From the debutaniser 26 the water passes along a line 60 to the debutaniser 28 where trace quantities of butane remaining in the water are removed. The product fresh water passes along a line 62 from the debutaniser 28 to the reservoir 30. Wash water for washing the ice crystals in the separator/melter 14 is taken from the line 56 along a line 64.

The reject saline water from which ice crystals have been separated passes from the separator/melter 14 along a line 66 which leads to the heat exchanger 20. Saline water leaves the heat exchanger 20 along a line 68 which leads to the butane condenser 24; in the butane condenser 24 butane vapour from the separator/melter is cooled and condensed by heat exchange with the saline water and with water from the heat exchanger 22; the saline water from the heat exchanger 20 and the water from the heat exchanger 22 are kept separate in the butane condenser 24. The saline water leaves the butane condenser 24 along a line 70 which leads to the debutaniser 26 which recovers small quantities of suspended and dissolved butane from the saline water; in the debutaniser 26 the saline water from the heat exchanger 20 is kept separate from the water from the heat exchanger 22. The saline water is rejected from the plant along a line 72 which leads from the debutaniser 26. Some saline water from the line 66 is recycled along a line 74 to the line 48 which leads into the freezer/crystalliser 12.

Butane for the freezing of ice crystals in the freezer/crystalliser 12 is pumped continuously round the plant in a closed cycle. Liquid butane at a temperature not less than 5° F. above that of the slurry in the freezer/crystalliser 12 enters the freezer/crystalliser 12 along a line 96 and butane vapour leaves the freezer/crystalliser 12 along a line 78 leading to the compressor 32. From the compressor 32 butane vapour passes along a line 80 to the separator/melter 14 where it is cooled and partially condensed by direct contact with the ice crystals, which are melted. Liquid butane condensed in the separator/melter 14 leaves the separator/melter 14 along the line 96 which leads to the freezer/crystalliser 12. Butane vapour leaves the separator/melter 14 along a line 82 which leads to the compressor 34. The vapour leaves the compressor 34 along a line 84 which leads to the butane condenser 24 where the butane is condensed by contacting reject saline water from the heat exchanger 22 and water from the heat exchanger 20; from the butane condenser 24 liquid butane is recycled to the freezer/crystalliser 12, for further boiling in saline water, along a line 76 which leads into the line 96. Butane make-up enters the line 96 along a line 86 as required. The debutaniser 26 is operated at three different degrees of vacuum which are maintained by the pumps 35, 37, 39. Butane vapour passes from the debutaniser 26 along lines 88, 90, which lead, via the vacuum pumps 35, 37, respectively into a line 92 leading to the line 78 which leads to the compressor 32.

The intake unit 18 (FIG. 1) comprises a travelling band screen 100 which is washed by water recirculated from the line 38 via a pump 102. Solid material screened by the screen 100 is rejected down a chute 104.

The freezer/crystalliser 12 (FIGS. 2–5) comprises a container 105 for sea water in which are provided four bays 106, 108, 110, 112 which are separated by a straight wall 114 and the limbs of a U-shaped wall 116; adjacent bays are connected by U-bends 118, 119, 121, 123; the bays 106–112 provide a long extended flow path for water flowing through the container 105. In the operation of the plant sea water enters the bay 106 from the line 48 and follows a sepentine path through the bays 106, 108, 110, 112, in the direction indicated by the arrows in FIG. 2.

The freezer/crystalliser 12 also comprises a weir plate 120 and some ice/water slurry leaves the bay 112 over the weir plate 120 and passes via a hood 122 into the line 50; the remainder of the slurry from the bay 112 is recycled to the bay 106 via the bend 123. The freezer/crystalliser 12 comprises two propellers 124 arranged to induce the flow in the direction of the arrows; each propeller 124 is located in one of the U-bends 118, 119. The weir plate 120 acts to disentrain butane bubbles from the slurry which is to pass over it.

The freezer/crystalliser 12 comprises a plurality of horizontal pipes 126 arranged for the injection of liquid butane for contacting with saline water in the container 105; the pipes 126 are supported in the bays 106–112 and in the U-bends 118–123; there is a group of four pipe portions on either side of each bay 106–112; there is also a group of four pipe portions on either side of each U-bend 118–121 and a group of four pipe portions on the inner side of the U-bend 123; in each of the two bends 118, 119 the pipe portions terminate clear of the propeller 124. The pipes 126 are submerged in the operation of the plant and are spaced above a base wall 128 of the freezer/crystalliser 12. The pipes 126 are connected to the butane inlet line 96 by a plurality of downcomers 130 and manifolds 132. Each pipe 126 is perforated with a plurality of evenly spaced small holes 127 (FIG. 5) which are provided along the pipes 126 where they extend along the bays 106–112 and the bends 118–123; the pipes 126 are not perforated where they extend across the bays 108–112 at 125 and across the bends 118, 119 at 127.

The freezer/crystalliser 12 comprises a plurality of vertical baffles 134 which are arranged on either side of each bay 106–112 and each bend 118–123. Each baffle 134 is submerged in the operation of the plant and is spaced above the base wall 128.

Each group of four pipe portions 126 is located between one of the baffles 134 and an inner peripheral surface 136 of the appropriate bay 106–112 or U-bend 118–123, the group of pipe portions being closely spaced to the baffle 134 and the surface 136; the lateral spacing between each pair of adjacent baffles 134 is approximately the same as that between each surface 136 and the adjacent baffle 134 (FIG. 4). There are discontinuities in the baffles 134, extending past the inlet line 48, and in the bends 118, 119 the baffles 134 terminating clear of the propellers 124.

The butane outlet line 78 leads outwardly from an upwardly extending portion 138 of the freezer/crystalliser 12; the weir plate 120 is directly below where the line 78 leads out of the portion 138.

In the operation of the plant, a slurry of ice crystals in saline water flowing through the bays 106–112 is kept continuously circulating around the baffles 134 in turbulent flow by the action of liquid butane continuously injected through the holes 127 for flow up past the baffles 134. The circulation takes place around the baffles 134 (FIG. 4) as follows: up along the space between a baffle 134 and the adjacent surface 136 and down along the other side of the baffle 134 and again into the space between the baffle 134 and the surface 136 for flow up therealong: this is indicated by arrows in FIG. 4. During circulation the ice crystals are uniformly distributed in the slurry. Some brine from the line 48 is passed to sprays 139 arranged to keep roof supports 137 of the freezer/crystalliser 12 free of ice.

Figure 8:
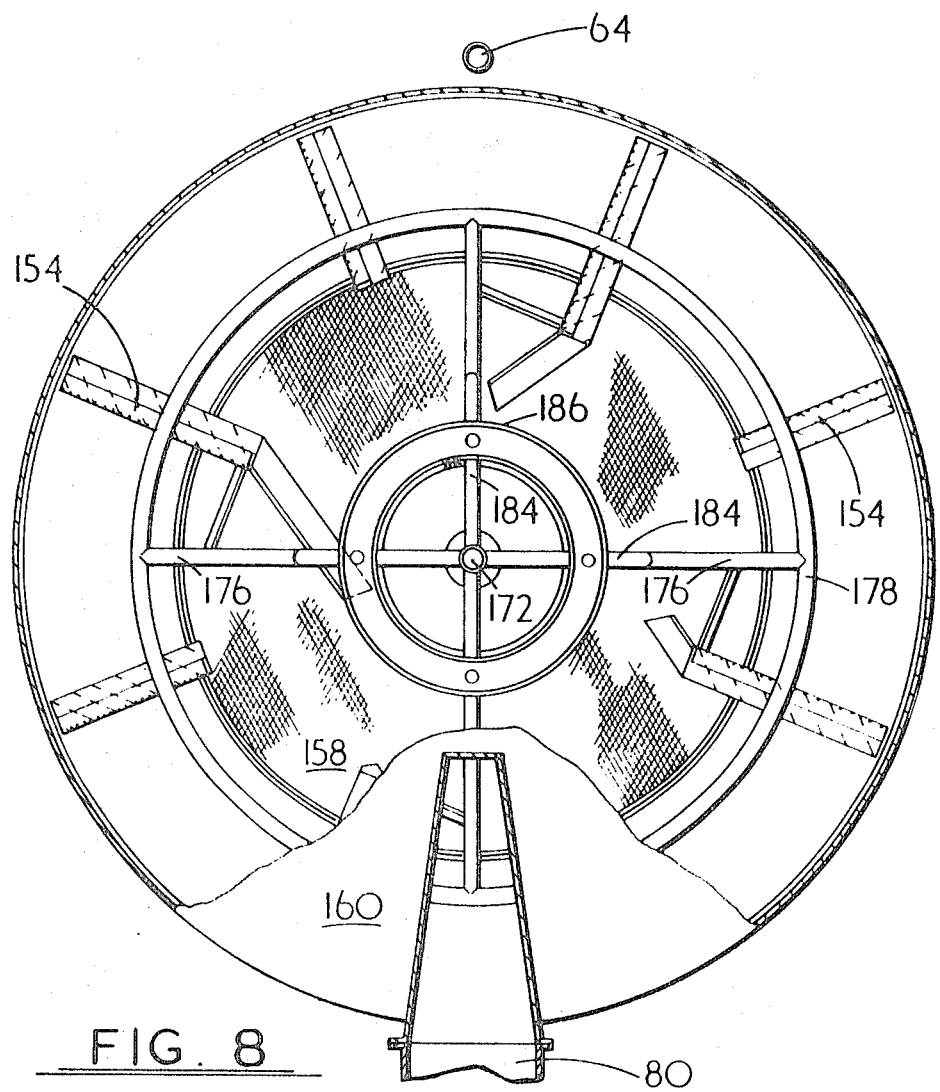
FIG. 8 shows a section on the line VIII—VIII of FIG. 6.
Figures 9, 10, 11:
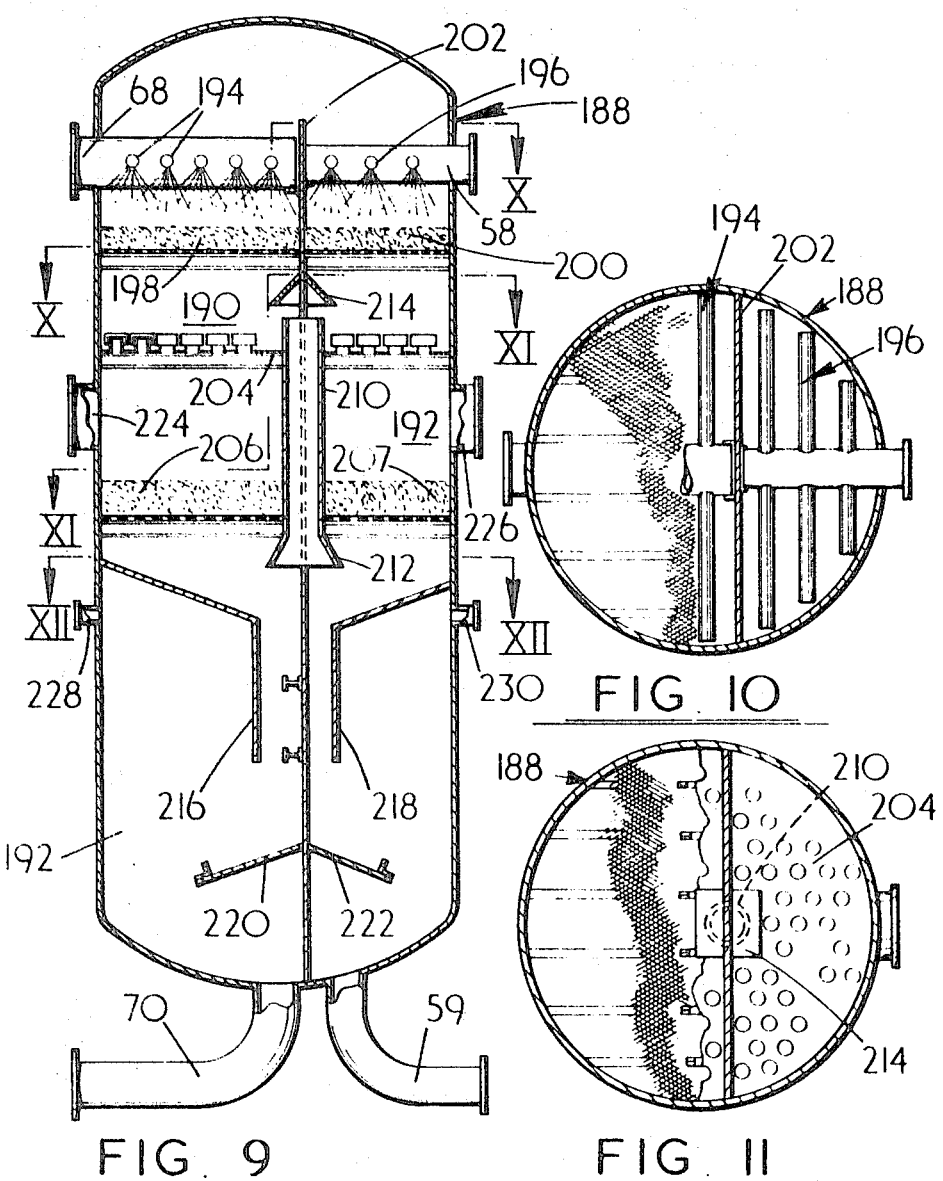
FIG. 9 shows a sectional side view of a butane condenser of the plant.
FIG. 10 shows a section on the line X—X of FIG. 9.
FIG. 11 shows a section on the line XI—XI of FIG. 9.
Figure 12:
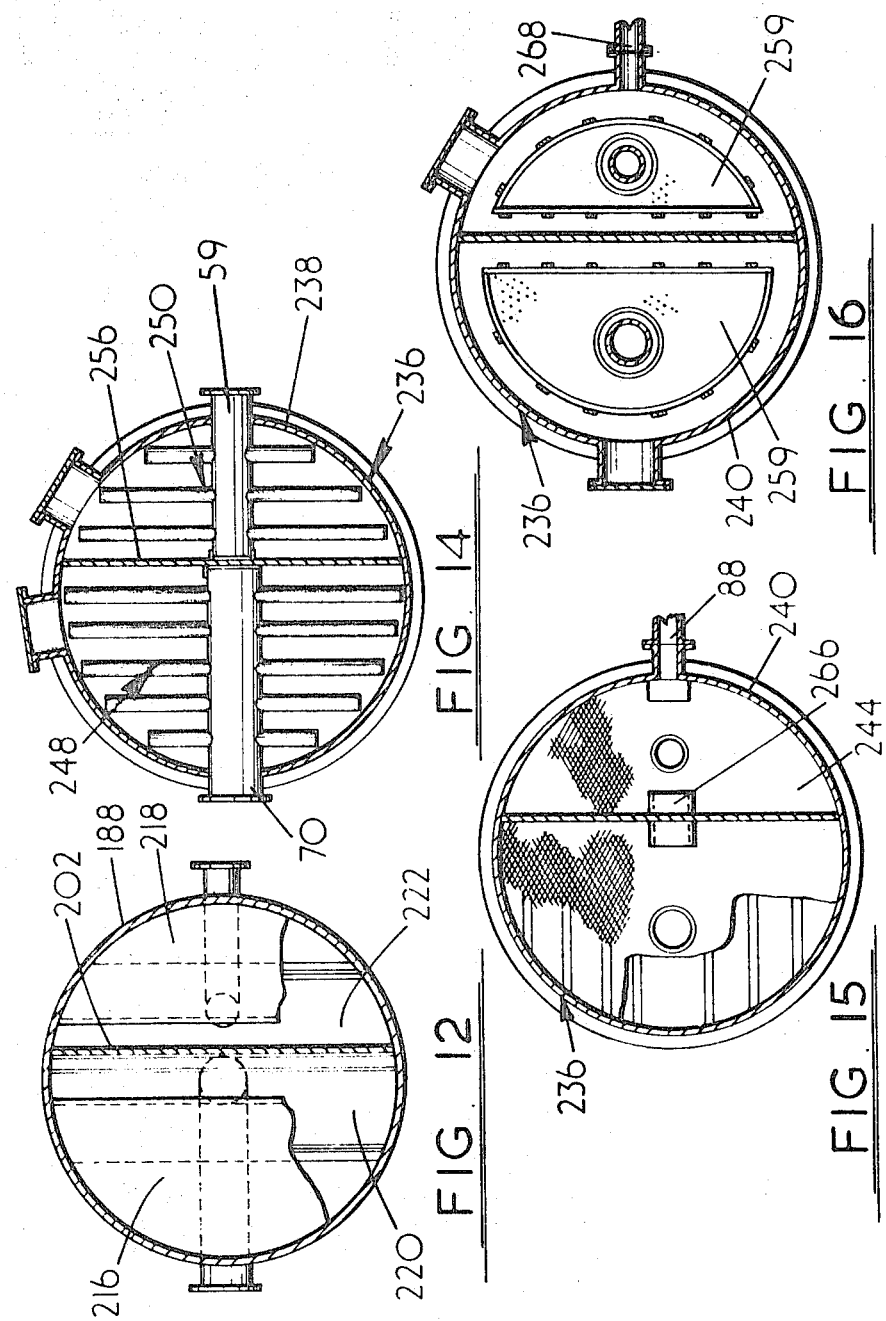
FIG. 12 shows a section of the line XII—XII of FIG. 9.
Figure 13:
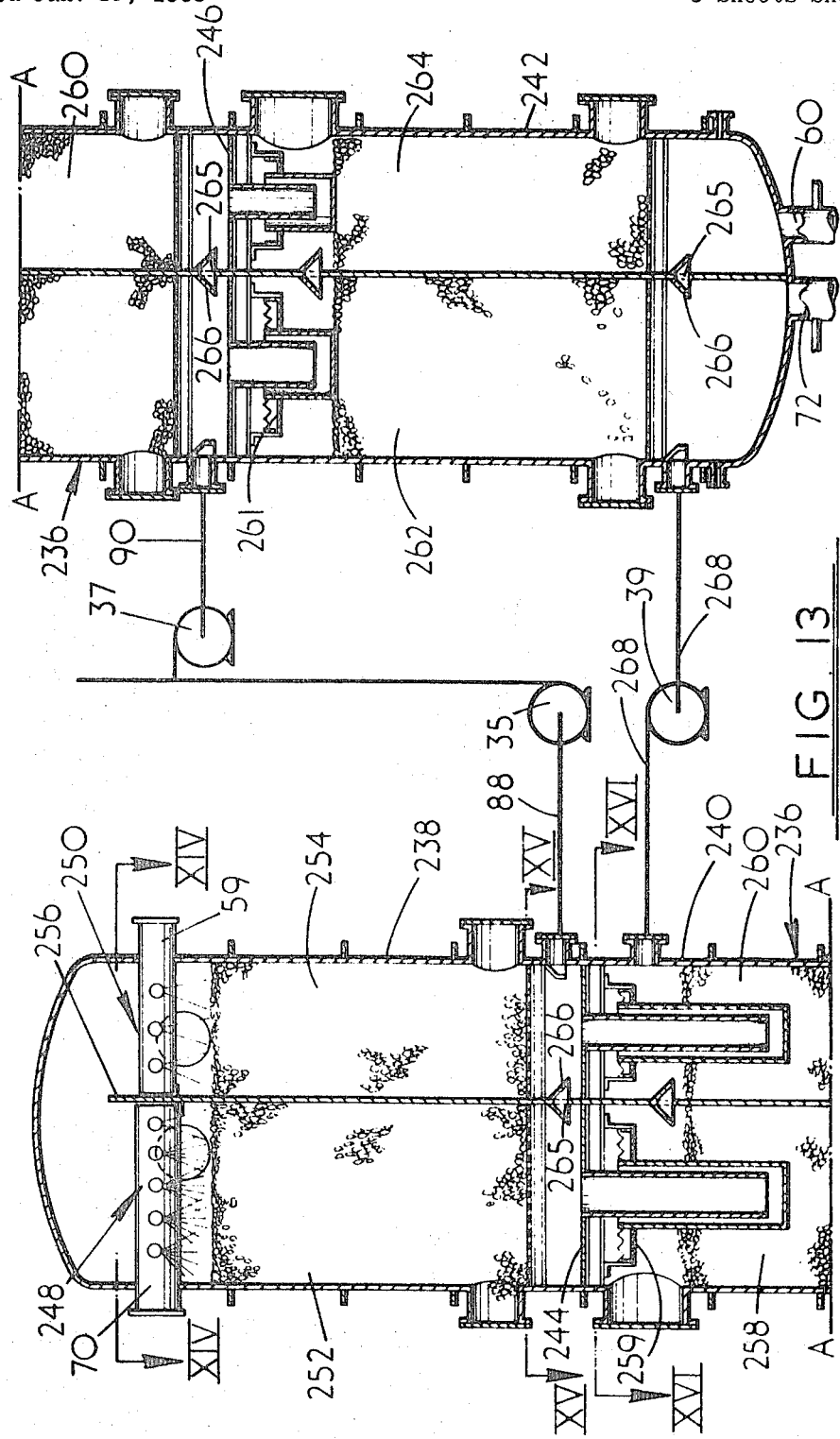
FIG. 13 shows a sectional side elevation of a debutaniser of the plant.

The separator/melter 14 (FIGS. 6, 7, and 8) comprises a circular tank 140 in which are provided concentric outer and inner adjacent annular chambers 142, 144 respectively; both chambers 142, 144 are open at the top.

In the operation of the plant ice crystals are washed and separated from saline water in the chamber 142; and in the chamber 144 ice crystals from the chamber 142 are melted by contact with butane vapour, some of which is condensed.

The chamber 142 is lined with a plastics liner 146 of, for example, polypropylene or polyvinyl chloride. A plurality of perforated drain grids 148 are provided in the liner 146 and are in communication with annular drainage boxes 150 which are connected by pipes 153 to the outlet line 66. The separator/melter 14 also comprises an assembly 152 which is mounted for rotation about the axis of the tank 140 and on which are mounted eight water spray tubes 154 and eight plough arms 156.

In the operation of the plant a bed of ice crystals and saline water derived from the inlet line 50 rises slowly continuously up along the chamber 142 and saline water drains through the grids 148, the drainage boxes 150 and the pipes 153 into the line 66. The plough arms 156 continuously scrape ice crystals into the chamber 144 and wash water from the line 64 is sprayed continuously onto the rising bed, at a sufficient velocity to flood the bed, by the spray tubes 154; most of the wash water leaves the chamber 142 with the ice crystals entering the chamber 144 and only a little leaves with the reject saline water.

A wire mesh grid 158 extends across the chamber 144 and the ice crystals from the chamber 142 are dumped onto the grid 158. Butane vapour from the inlet 80 enters an upper frusto-conical portion 160 of the tank 140 in laminar flow and contacts the ice crystals on the grid 158. A plate 159 extends across the chamber 144 below the grid 158 and four downcomer pipes 161 extend downwardly therefrom.

Water melted from the ice crystals and condensed butane pass downwardly through the pipes 161, collect in two layers below the plate 159 and are drawn off from the separate layers to pass into the lines 56, 96 respectively.

The separator/melter 14 comprises an axial pipe 162 which leads to the butane vapour outlet line 82; four pipes 164 lead from the chamber 144 below the grid 158 into the pipe 162; uncondensed butane vapour passes from the separator/melter 14 to the line 82 via the pipes 164, 162. The separator/melter 14 also comprises an annular weir box 166 in the chamber 144 from which a pipe 168 leads to the liquid butane outlet line 96 so that liquid butane collecting in the chamber 144 passes to the line 96. Water collecting in the chamber 144 passes to the line 56 by pipes 170 which lead from the bottom of the chamber 144.

The assembly 152 comprises a vertical shaft 172 which is mounted for rotation in the tank 140; in the operation of the plant the shaft 172 is driven by an electric motor and gearbox unit 174. Four horizontal pipes 176 extend radially from the shaft 172 and lead into a ring pipe 178. The spray tubes 154 are secured to the ring pipe 178 and the plough arms 156 are also secured to the ring pipe 178 below the level of the spray tubes 154; the spray tubes 154 are in communication with the ring pipe 178 and each tube 154 has a plough arm 156 adjacent thereto. Four inclined pipes 184 extend from the pipes 176 to the pipes 176 and are in communication with an annular box 186 which is secured to the pipes 184 and with which the wash water line 64 communicates via downcomer pipes 185. In the operation of the plant wash water is supplied to the spray tubes 154 from the line 64 via the box 186 and the pipes 184, 176, 178. Alternate plough arms 156 extend over the inner chamber 144 as well as over the chamber 142 while the remaining plough arms 156 terminate substantially at the inner periphery of the chamber 142.

The salt concentration of the water layer in the chamber 144 is measured by an instrument (not shown) which controls the pressure at the drainage boxes 150. Variations in the salt concentration vary the suction on the drainage grids 148 which results in variations in the amount of wash water being drawn through the ice bed.

The butane condenser 24 (FIGS. 9–12) comprises a tower 188 which is divided into upper and lower compartments 190, 192, respectively, by a bubble cap tray 204. Adjacent liquid spray devices 194, 196 are provided in the upper compartment 190; and adjacent packings 198, 200 of Berl saddles are also provided directly below the spray devices 194, 196, respectively; the spray device 194 and the packing 198 are separated from the spray device 196 and the packing 200 by a vertical partition 202 which extends across the whole width of the tower 188. Adjacent packings 206, 207 of Berl saddles are also provided in the lower compartment 192 directly below the packings 198, 200, respectively. The partition 202 also substantially separates the packings 206, 207 and substantially divides the bubble tray 204 into separate portions. A vertical tube 210 extends axially of the tower 188 from below the packings 206, 207 to above the bubble tray 204; the tube 210 comprises a conical lower outlet 212 and has a roof-shaped baffle 214 directly above its upper end. Baffles 216, 218, 220, 222 are also provided in the compartment 192 generally below the tube 210.

In the operation of the plant water from the line 58 if sprayed by the spray device 196 and saline water from the line 68 is sprayed by the spray device 194; in the tower 188 the water from the spray device 196 is kept separate from the water from the spray device 194. Butane vapour from the line 84 enters the lower compartment 192 by inlets 224, 226 on opposite sides of the partition 202 respectively. The butane vapour entering by the inlet 224 passes downwardly through the packing 206 where it is contacted in co-current flow with water, from the spray 194, which has passed through the packing 198 and been redistributed by the bubble cap tray 204 which acts to provide a liquid seal between the compartments 190, 192; no gas passes upwardly through the tray 204. Some butane condenses from the vapour and the remaining vapour passes up the tube 210 and into the packing 198 where it is contacted in countercurrent flow with water from the spray 194; this causes the butane vapour to condense and it passes together with the water through the bubble cap tray 204 and the packing 206; the baffle 214 directs liquid away from the upper end of the tube 210. Butane vapour entering the inlet 226 is contacted with water from the spray device 196 in a corresponding manner. The liquid butane and water form two layers in the compartment 192 on both sides of the partition 202 and liquid butane leaves the tower 188 by outlets 228, 230 which both lead to the line 76. Saline water leaves the tower 188 by the line 70 and water from the spray device 196 leaves the tower 188 by the line 59. The baffles 216, 218, 220, 222 act to provide seals around the outlets 228, 230, and the lines 70, 59.

The debutaniser 26 (FIGS. 13–16) comprises a tower 236 which is divided into upper, central and lower compartments 238, 240, 242, by liquid seal devices 244, 246. Adjacent liquid spray devices 248, 250 are provided in the upper compartment 238 and adjacent packings 252, 254 of Pall rings are also provided directly below the spray devices 248, 250, respectively; the spray device 248 and the packing 252 are separated from the spray device 250 and the packing 254 by a vertical partition 256 which extends across the whole width of the tower 236. Adjacent packings 258, 260 of Pall rings are also provided in the central compartment 240 directly below the packings 252, 254, respectively. The partition 256 also separates the packings 258, 260. Similarly, adjacent packings 262, 264 of Pall rings are provided in the lower compartment 242 directly below the packings 258, 260, respectively. Again the partition 256 separates the packings 262, 264. Holes 265 are provided in the partition 256 to equalise the gas pressures on either side thereof. Baffles 266 are provided around the holes 265 to restrain passage of water therethrough. In the operation of the plant the three compartments 238, 240, 242 are subjected to different degrees of vacuum by the vacuum pumps 35, 37, 39 respectively; the lowest degree of vacuum is in the compartment 238 and the highest in the compartment 242. Saline water from the line 70 is sprayed by the spray device 248 and passes successively through the packing 252, the seal device 244, the packing 258, the seal device 246 and the packing 262; the water leaves the tower 236 by the line 72; water is redistributed over the packings 258, 262 by perforated plates 259, 261 of the seal devices 244, 246, respectively. Water from the line 59 is sprayed by the spray device 250, passes through the tower 236 in a corresponding manner and leaves the tower 236 by the line 60. Butane leaves the compartments 238, 240 by the lines 88, 90 which lead to the pumps 35, 37, respectively; butane leaves the compartment 242 by a line 268 which leads via the pump 39 to the compartment 240.

The debutaniser 28 (FIG. 1) comprises a tower 272 containing a spray device 274, a packing 275 of Pall rings and an air distributor 276 which is supplied by a fan 278. In the operation of the plant water from the line 60 is sprayed by the spray device 274 and is stripped of butane on the packing 275 by a countercurrent stream of air from the air distributor 276. The air containing the stripped butane enters the atmosphere via a chimney 280.

In modified forms of the plant one or more of the following modifications are made:

(a) Each heat exchanger, 20, 22 is replaced by a double direct contact heat exchanger employing an intermediate heat exchange medium.

(b) A sieve bend classifier of the kind referred to in U.K. patent specification No. 791,520 (Stamicarbon) is inserted in the line 50 following the freezer/crystalliser 12. In this case crystals below a certain size are returned to the freezer/crystalliser 12 to form new centres for crystal growth or to be destroyed with consequent abstraction of their latent heat of fusion from the incoming saline water.

(c) The sea water feed is de-aerated.

Typical operating conditions for the plant in a temperate climate are as follows:

Mass flows (lbs./hr.)

Sea water feed: 5.2 million.
Product desalinated water: 2.1 million.
Recycle product water for washing ice crystals: 2.3 million.
Recycle reject saline water to freezer/crystalliser: 3.5 million.
Ice in ice/water slurry out of freezer/crystalliser: 2.2 million.
Saline water in ice/water slurry out of freezer/crystalliser: 6.6 million.
Liquid butane from separator/melter to freezer/crystalliser: 1.9 million.
Liquid butane from butane condenser to freezer/crystalliser: 0.3 million.
Gaseous butane into separator/melter: 2.2 million.
Retention time in freezer/crystalliser: 7 minutes.
Linear velocity in freezer/crystalliser: 5 feet/second.
Wash water leaving separator/melter with reject brine: 5% of product water.

TEMPERATURES (° F.)

Heat exchanger 20

Sea water feed in: 50
Sea water out: 34
Reject saline water in: 26
Reject saline water out: 43

Heat exchanger 22

Sea water feed in: 50
Sea water out: 38
Product water in: 32
Product water out: 43

Freezer/crystalliser 12

Feed in (including saline water recycle): 31
Slurry out (and in container 105): 26
Liquid butane in: 35
Butane vapour out: 24

Separator/melter 14

Slurry in: 26
Slurry from chamber 142 to chamber 144: 32
Product water out: 32
Reject saline water out: 26
Butane vapour in: 37
Butane liquid out: 35
Butane vapour out: 35

Butane condenser 24

Product water in: 43
Product water out: 54
Saline water in: 43
Saline water out: 54
Butane vapour in: 55
Butane liquid out: 55

Vacuum debutaniser 26

Operating temperature: 54

Air stripper debutaniser 28

Operating temperature: 54

Salt concentrations (parts per million)

Sea water feed: 35,000
Product desalinated water: 100

Pressures (lbs. per square inch absolute)

Freezer/crystalliser: 12.6
Separator/melter: 15.9
Butane condenser: 23.8
Vacuum debutaniser: 3.74; 1.11; and 0.33
Air stripper debutaniser: atmospheric.

Ice crystals

Effective diameter: 0.5 mm. (Carman-Kozeny)
Thickness: ⅕ diameter
Percentage solids in freezer/crystallizer: 25%

Butane n-Butane with a boiling range extending over not more than 1.8° F. and with not more than 1% impurities having a Henry's law constant greater than that of n-butane.

Concentration in saline water entering vacuum debutaniser: 100 p.p.m.
Concentration in product water entering vacuum debutaniser: 200 p.p.m.
Concentration in each water stream leaving vacuum debutaniser: 2 p.p.m.
Concentration in product water stream leaving air stripper debutaniser: 0.2 p.p.m.

What is claimed is:

1. Apparatus for use in producing fresh water from a slurry of ice crystals in saline water, comprising an internal melting chamber, an annular separating chamber disposed around the melting chamber, a common wall between the two chambers, means for passing the slurry upwardly through the separating chamber, water spray means for spraying the upper surface of the slurry so as to wash the ice crystals, water drain means around the separating chamber for draining saline and spent wash water from the separating chamber, rotatable plough means for transferring the separated and washed ice crystals over the common wall and into the melting chamber to be melted.

2. Apparatus as claimed in claim 1 wherein the ice crystals in the second chamber are melted by contact with refrigerant vapour.

3. Apparatus as claimed in claim 2, wherein there is provided a grid in the melting chamber which supports the ice crystals but allows the downward passage of water melted from the ice crystals, refrigerant vapour and condensed refrigerant.

4. Apparatus as claimed in claim 3, wherein a refrigerant vapour inlet is provided in means defining an enclosed space above the chambers and a central outlet duct is provided below the grid in the melting chamber.

5. Apparatus as claimed in claim 3 wherein the condensed refrigerant and the water pass to a sump in the second chamber in which they collect in two separate layers from which they are each drawn off.

6. Apparatus as claimed in claim 1 wherein the rotatable plough means comprises a plurality of plough members supported from a frame rotatable about a vertical axis, said frame also supporting the water spray means which comprises a plurality of water spray tubes, elements of the frame being used to conduct the water to the spray tubes.

7. Apparatus as claimed in claim 1, wherein the separating chamber is lined with a plastics liner.

8. Apparatus as claimed in claim 7 wherein the plastics liner is of polypropylene or polyvinyl chloride.

9. Apparatus as claimed in claim 1, wherein means are provided for controlling the amount of spray water drawn through the ice crystal bed in the separating chamber by adjustment of the pressure at the water drain in accordance with the salt concentration of the melted water in the melting chamber.

References Cited
UNITED STATES PATENTS

| | | | |
|---|---|---|---|
| 1,865,614 | 7/1932 | Caldwell | 62—58 |
| 3,049,888 | 8/1962 | Bosworth | 62—58 |
| 3,073,131 | 1/1963 | Ashley | 62—58 |
| 3,240,024 | 3/1966 | Ashley et al. | 62—58 |
| 3,292,386 | 12/1966 | Johnson et al. | 62—58 |
| 3,400,549 | 9/1968 | Karnofsky | 62—58 |
| 3,435,625 | 4/1969 | Wiegandt | 62—58 |

NORMAN YUDKOFF, Primary Examiner

R. T. FOSTER, Assistant Examiner

U.S. Cl. X.R.

62—58